(12) United States Patent
Atsuki et al.

(10) Patent No.: US 8,574,759 B2
(45) Date of Patent: Nov. 5, 2013

(54) POSITIVE ELECTRODE FORMING MATERIAL, COMPONENT THEREOF, METHOD FOR PRODUCING THE SAME AND RECHARGEABLE LITHIUM-ION BATTERY

(75) Inventors: Tsutomu Atsuki, Chiba (JP); Hiroyuki Imai, Akita (JP); Osamu Sakaya, Akita (JP)

(73) Assignees: Mitsubishi Materials Corporation, Tokyo (JP); Mitsubishi Materials Electronic Chemicals Co., Ltd., Akita (JP)

( * ) Notice: Subject to any disclaimer, the term of this patent is extended or adjusted under 35 U.S.C. 154(b) by 948 days.

(21) Appl. No.: 12/593,871

(22) PCT Filed: Mar. 28, 2008

(86) PCT No.: PCT/JP2008/056169
§ 371 (c)(1),
(2), (4) Date: Sep. 29, 2009

(87) PCT Pub. No.: WO2008/123444
PCT Pub. Date: Oct. 16, 2008

(65) Prior Publication Data
US 2010/0075229 A1    Mar. 25, 2010

(30) Foreign Application Priority Data

Mar. 29, 2007    (JP) ................................. 2007-086436

(51) Int. Cl.
*H01M 4/13*    (2010.01)
*H01M 4/60*    (2006.01)
*H01M 4/02*    (2006.01)
*H01M 4/68*    (2006.01)

(52) U.S. Cl.
USPC ..... 429/212; 429/209; 429/231.8; 429/231.9; 429/231.95; 977/942

(58) Field of Classification Search
USPC .............. 429/212, 209, 231.8, 231.9, 231.95; 423/448; 977/942
See application file for complete search history.

(56) References Cited

U.S. PATENT DOCUMENTS

| 5,494,762 | A | * | 2/1996 | Isoyama et al. ............... 429/221 |
| 6,337,155 | B1 | | 1/2002 | Takei et al. |

(Continued)

FOREIGN PATENT DOCUMENTS

| CN | 1784516 A | 6/2006 |
| EP | 1589079 A1 | 10/2005 |

(Continued)

OTHER PUBLICATIONS

Chinese Office Action mailed Sep. 22, 2011 for the corresponding Chinese patent application No. 200880010027.1.

(Continued)

*Primary Examiner* — Patrick Ryan
*Assistant Examiner* — Julian Anthony
(74) *Attorney, Agent, or Firm* — Leason Ellis LLP

(57) ABSTRACT

Disclosed is a positive electrode forming material for a positive electrode of a battery, the material including particles of a positive electrode active material and fine carbon fibers adhering to surfaces of particles of the positive electrode active material in a shape of a network. The positive electrode active material is preferably fine particles having an average particle diameter of 0.03 to 40 μm. Each of the fine carbon fibers is preferably carbon nanofiber having an average fiber diameter of 1 to 100 nm and an aspect ratio of 5 or greater. The carbon nanofiber is surface-oxidized. The positive electrode forming material includes a binder. The content of the fine carbon fibers is 0.5 to 15 parts by mass and the content of the binder is 0.5 to 10 parts by mass with respect to 100 parts by mass of the positive electrode active material.

14 Claims, 6 Drawing Sheets

(56) References Cited

U.S. PATENT DOCUMENTS

| | | | |
|---|---|---|---|
| 6,528,211 B1 * | 3/2003 | Nishimura et al. | 429/231.8 |
| 7,625,673 B2 * | 12/2009 | Kudo et al. | 429/231.8 |
| 2003/0039604 A1 * | 2/2003 | Niu et al. | 423/447.1 |
| 2006/0188784 A1 | 8/2006 | Sudoh et al. | |
| 2007/0111101 A1 | 5/2007 | Ohkubo et al. | |
| 2007/0202410 A1 | 8/2007 | Takeuchi et al. | |

FOREIGN PATENT DOCUMENTS

| | | |
|---|---|---|
| JP | 2000-182622 A | 6/2000 |
| JP | 2000-208147 A | 7/2000 |
| JP | 2004-213968 A | 7/2004 |
| JP | 2004-220909 A | 8/2004 |
| JP | 2005-063955 A | 3/2005 |
| JP | 2005-340152 A | 12/2005 |
| JP | 2006-086116 A | 3/2006 |
| WO | WO 2004/099477 A2 | 11/2004 |
| WO | WO-2006/019148 A1 | 2/2006 |

OTHER PUBLICATIONS

European Search Report mailed Mar. 26, 2012 for the corresponding European Application No. 08739287.4.

Mao-Sung Wu et al., Carbon-nanofiber composite electrodes for thin and flexible lithium-ion batteries, *Journal of Materials Science*, 2006, pp. 259-265, vol. 42 No. 1.

Xinlu Li et al., A Comparative Investigation on Multiwalled Carbon Nanotubes and Carbon Black as Conducting Additive in $LiNi_{0.7}Co_{0.3}O_{21}$, *Electrochemical and Solid-State Letters*, 2006, pp. A126-A129, vol. 9 No. 3.

European Office Action mailed Nov. 30, 2012 for the corresponding European Application No. 08739287.4 (Previously submitted Jan. 24, 2013).

European Search Report mailed Nov. 30, 2012 for the corresponding European Application No. 08739287.4.

* cited by examiner

POSITIVE ELECTRODE FORMING MATERIAL, COMPONENT THEREOF, METHOD FOR PRODUCING THE SAME AND RECHARGEABLE LITHIUM-ION BATTERY

CROSS REFERENCE TO RELATED APPLICATION

This is the U.S. national phase application under 35 U.S.C. §371 of International Patent Application No. PCT/JP2008/056169, filed Mar. 28, 2008, which claims the benefit of Japanese Application No. 2007-086436, filed Mar. 29, 2007. The International Application was published on Oct. 16, 2008 as International Publication No. WO/2008/123444 under PCT Article 21(2). The contents of these applications are incorporated herein in their entirety.

TECHNICAL FIELD

The present invention relates to a positive electrode forming material and components thereof which may prevent decrease in battery energy density and improve output performance, a method for producing the same and a rechargeable lithium-ion battery.

BACKGROUND OF THE INVENTION

With recent developments in portable electronic devices including mobile phones and notebook PCs and with the recent advent of practical electric vehicles, there has been increased demand for compact, lightweight and high-capacity rechargeable batteries. To address this demand, a rechargeable lithium-ion battery is now marketed as a high-capacity rechargeable battery. The rechargeable lithium-ion battery includes a lithium-containing transition metal oxide, such as $LiCoO_2$, as a positive electrode forming material and a carbon-based material as a negative electrode active material. The rechargeable lithium-ion battery has high energy density and may be made compact and lightweight, and thus has been considered as an important power supply for portable electronic devices.

A currently available lithium battery typically has a positive semiconductor electrode with a positive electrode active material of poor electron conductivity. In order to provide sufficient conductivity of the electrode, a conducting agent and a binder are added to a positive electrode mixture. The conducting agent may be carbon black, acetylene black, Ketchen black and graphite.

Japanese Unexamined Patent Application Publication, First Publication No. 2000-208147 discloses a positive electrode structure in which fine carbon black powder is attached to surfaces of positive electrode active material particles and the space between the particles of the positive electrode active material is filled with natural graphite and carbon fibers. Japanese Unexamined Patent Application Publication, First Publication No. 2006-86116 discloses a positive electrode structure which includes a positive electrode active material and a carbon-based conducting agent. The carbon-based conducting agent contains nano-sized carbon fibers. Japanese Unexamined Patent Application Publication, First Publication No. 2004-220909 discloses a positive electrode structure in which the space between the particles of the positive electrode active material is filled with carbon nanofiber.

High-rate discharging performance of a battery may be improved by an increased content of a conducting agent in a positive electrode. An excessively high content of the conducting agent, however, may result in a reduced ratio of the lithium-containing transition metal oxide, which may in turn result in reduced discharge capacity. A dispersing agent is used to disperse carbon black, acetylene black, Ketchen black or graphite, as well as normal carbon nanofiber and a carbon nanotube in a positive electrode forming material. The dispersing agent, however, may decompose resulting in the disadvantageous generation of gas. In a known positive electrode structure, the space between particles of the positive electrode active material is filled with a carbon-based material used as a conducting agent, which structure may require a relatively large content of conducting agent.

The present invention has been devised to solve these problems in the structures and materials of the related art positive electrodes for batteries. The present invention provides, among others, a positive electrode forming material and components thereof for forming a positive electrode structure having improved conductivity while keeping enhanced positive electrode performance. The positive electrode structure may be fabricated by dispersing electrical conducting materials in a solution without a dispersing agent and forming a network conductive film on a particle surface of the positive electrode active material.

SUMMARY OF THE INVENTION

In view of the above circumstances, the present invention relates to a positive electrode forming material having the following aspects.

ASPECT 1; A positive electrode forming material for a positive electrode of a battery which includes fine carbon fibers adhering to a particle surface of a positive electrode active material in a shape of a network.

ASPECT 2; The positive electrode forming material of ASPECT 1, in which the positive electrode active material consists of fine particles having an average particle diameter of 0.03 to 40 μm, and each of the fine carbon fibers is carbon nanofiber having an average fiber diameter of 1 to 100 nm and an aspect ratio of 5 or greater.

ASPECT 3; The positive electrode forming material of ASPECT 1 or 2, in which the content of the fine carbon fibers is 0.5 to 15 parts by mass with respect to 100 parts by mass of the positive electrode active material. The positive electrode forming material further includes a binder at a content of 0.5 to 10 parts by mass.

ASPECT 4; The positive electrode forming material of any one of ASPECT 1 to 3, which includes carbon powder that is finer than the positive electrode active material with the fine carbon fibers.

ASPECT 5; The positive electrode forming material of ASPECT 4, in which the content of the carbon powder is 0.5 to 5 parts by mass with respect to 100 parts by mass of the positive electrode active material.

ASPECT 6; The positive electrode forming material of any one of ASPECT 1 to 5, in which the positive electrode active material forms a positive electrode for a lithium battery, consisting of lithium-containing transition metal oxide particles.

ASPECT 7; The positive electrode forming material of ASPECT 6, in which the lithium-containing transition metal oxide of the positive electrode active material is a compound which includes one or both of at least one compound selected from a group consisting of $LiCoO_2$, $LiNiO_2$, $LiMn_2O_4$, $LiMnCoO_4$, $LiCoPO_4$, $LiMnCrO_4$, $LiNiVO_4$, $LiMn_{1.5}Ni_{0.5}O_4$, $LiMnCrO_4$, $LiCoVO_4$ and $LiFePO_4$ and at least one compound selected from nonstoichiometric compounds having the above composition that is partially substituted by metallic elements.

The present invention also relates to the following components of the positive electrode forming material.

ASPECT 8; fine carbon fiber for a positive electrode forming material, which is carbon nanofiber having an average fiber diameter of 1 to 100 nm and an aspect ratio of 5 or greater. Surface of the fine carbon fiber is hydrophilized by oxidization. The fine carbon fibers are dispersed in a solution without a dispersing agent and made to adhere to a particle surface of the positive electrode active material so as to form a mesh.

ASPECT 9; A dispersion for a positive electrode forming material used in formation of a network coating of the fine carbon fibers on a particle surface of a positive electrode active material. The fine carbon fibers with surfaces hydrophilized by oxidization are dispersed in at least one dispersion medium selected from a group consisting of a solvent and water to provide the dispersion.

ASPECT 10; A coating material for a positive electrode forming material used in formation of a network coating. The coating material consists of a dispersion and a binder. The dispersion is prepared by dispersing the fine carbon fibers with surfaces hydrophilized by oxidization in at least one dispersion medium selected from a group consisting of a solvent and water.

ASPECT 11; Slurry or paste for the positive electrode forming material used in formation of network coating on a particle surface of a positive electrode active material. The slurry or paste includes dispersion, a binder and a positive electrode active material. The dispersion is prepared by dispersing the fine carbon fibers with surfaces hydrophilized by oxidization in at least one dispersion medium selected from a group consisting of a solvent and water.

The present invention also relates to a method for producing a positive electrode forming material and components thereof, and to an application thereof.

ASPECT 12; A method for preparing a dispersion for a positive electrode forming material, the method including: adding an oxidizer to acid suspension including fine carbon fibers; hydrophilizing surfaces of the fine carbon fibers by oxidization; collecting the fine carbon fibers by filtering separation; and mixing the fine carbon fibers with a dispersion medium.

ASPECT 13; A method for preparing a coating material for a positive electrode forming material, the method including adding a binder to a dispersion of the fine carbon fibers with surfaces hydrophilized by oxidization.

ASPECT 14; A method for preparing slurry or paste for a positive electrode forming material, the method including adding a positive electrode active material to a coating material, or adding a binder and a positive electrode active material to a dispersion of the fine carbon fibers. The coating material is prepared by adding a binder to the dispersion of the fine carbon fibers with surfaces hydrophilized by oxidization.

ASPECT 15; A method of any one of ASPECT 12 to 14, in which carbon powder that is finer than the positive electrode active material is added before, simultaneously or after the addition of the fine carbon fibers.

ASPECT 16; A positive electrode of a rechargeable lithium-ion battery. The positive electrode is fabricated by coating the slurry or paste of the positive electrode forming material of ASPECT 11 onto an aluminum current collector and then drying.

ASPECT 17; A rechargeable lithium-ion battery fabricated by using the positive electrode of ASPECT 16.

The positive electrode forming material according to an embodiment of the present invention may provide a positive electrode with fine carbon fibers coating made to disperse in a solution and adhere to the particle surface of the positive electrode active material in a shape of the network. Accordingly, the positive electrode may acquire greater conductivity with a relatively small content of carbon fibers, and may exhibit enhanced battery output performance. The fine carbon fibers with surfaces hydrophilized by oxidization are easily dispersed in a solution without a dispersing agent. Accordingly, there is no likelihood of gas generation, which may improve output performance of the positive electrode.

In the positive electrode forming material according to an embodiment of the present invention, a network layer of fine carbon fibers may be uniformly formed on the particle surface of the positive electrode active material by using carbon nanofibers as the fine carbon fibers having an average fiber diameter of 1 to 100 nm and an aspect ratio of 5 or greater against the positive electrode active material particles having an average particle diameter of 0.03 to 40 μm. In this manner, a positive electrode excellent in conductivity may be provided with a smaller content of the carbon fibers. In particular, the content of the fine carbon fibers is 0.5 to 15 parts by mass and preferably 1 to 10 parts by mass with respect to 100 parts by mass of the positive electrode active material.

The positive electrode forming material contains, in addition to the fine carbon powder, carbon powder that is finer than the positive electrode active material. The space between particles of the positive electrode active material is filled with the finer carbon powder. Conductivity of the positive electrode may further be improved if the content of the carbon powder is, for example, 0.5 to 5 parts by mass and preferably 1 to 3 parts by mass with respect to 100 parts by mass of the positive electrode active material.

Surfaces of the fine carbon fibers for the positive electrode forming material according to an embodiment of the present invention are hydrophilized by oxidization and thus its dispersion is well-dispersed in a solution without the dispersing agent. With this configuration, a network carbon fiber membrane may be uniformly formed on a surface of the positive electrode active material without the dispersing agent. In this manner, a positive electrode excellent in conductivity may be provided without gas generation caused by the dispersing agents.

The positive electrode forming material according to an embodiment of the present invention may preferably be applied to a positive electrode of a lithium-ion battery which includes lithium-containing transition metal oxide particles as the positive electrode active material. The lithium-containing transition metal oxide may be a compound which includes one or both of at least one compound selected from a group consisting of $LiCoO_2$, $LiNiO_2$, $LiMn_2O_4$, $LiMnCoO_4$, $LiCoPO_4$, $LiMnCrO_4$, $LiNiVO_4$, $LiMn_{1.5}Ni_{0.5}O_4$, $LiMnCrO_4$, $LiCoVO_4$ and $LiFePO_4$ and at least one compound selected from nonstoichiometric compounds having the above composition that is partially substituted by metallic elements. Such a configuration may provide a lithium-ion battery with improved charging and discharging cycles. The positive electrode forming material may also preferably be used as a positive electrode for a lithium battery, which may include a positive electrode active material fabricated with carbon black, Ketchen black and acetylene black to improve conductivity. Such a configuration may provide a lithium-ion battery with improved charging and discharging cycles.

The positive electrode forming material and the material thereof according to an embodiment of the present invention may be used as, for example, (A) a dispersion prepared by dispersing the fine carbon fibers with surfaces hydrophilized by oxidization in one or more solvents selected from a group consisting of a solvent and water; (B) a coating material prepared by adding a binder to the dispersion; and (C) slurry or paste prepared by adding the binder and the positive electrode active material to the dispersion.

The dispersion for the positive electrode forming material according to an embodiment of the present invention may be prepared by: adding an oxidizer to acid suspension including of the fine carbon fibers to oxidize the same; hydrophilizing surfaces of the fine carbon fibers by oxidization; collecting the fine carbon fibers by filtering separation; and mixing the fine carbon fibers with a solvent. The fine carbon fibers are well-dispersed in the solution without the dispersing agent. The dispersion may be used to provide a positive electrode forming material for forming a positive electrode excellent in battery performance.

The coating material for the positive electrode forming material may be prepared by adding a binder to a dispersion of the fine carbon fibers with surfaces hydrophilized by oxidization. Slurry or paste for the positive electrode forming material may be prepared by adding the positive electrode active material to the coating material or adding the binder and the positive electrode active material to the dispersion.

When the carbon powder that is finer than the positive electrode active material is used together with the carbon fibers, the carbon powder may be added before or after simultaneously with the addition of the fine carbon fibers. In this manner, a positive electrode forming material with further improved conductivity may be provided.

DETAIL DESCRIPTION OF THE INVENTION

Figure 1:
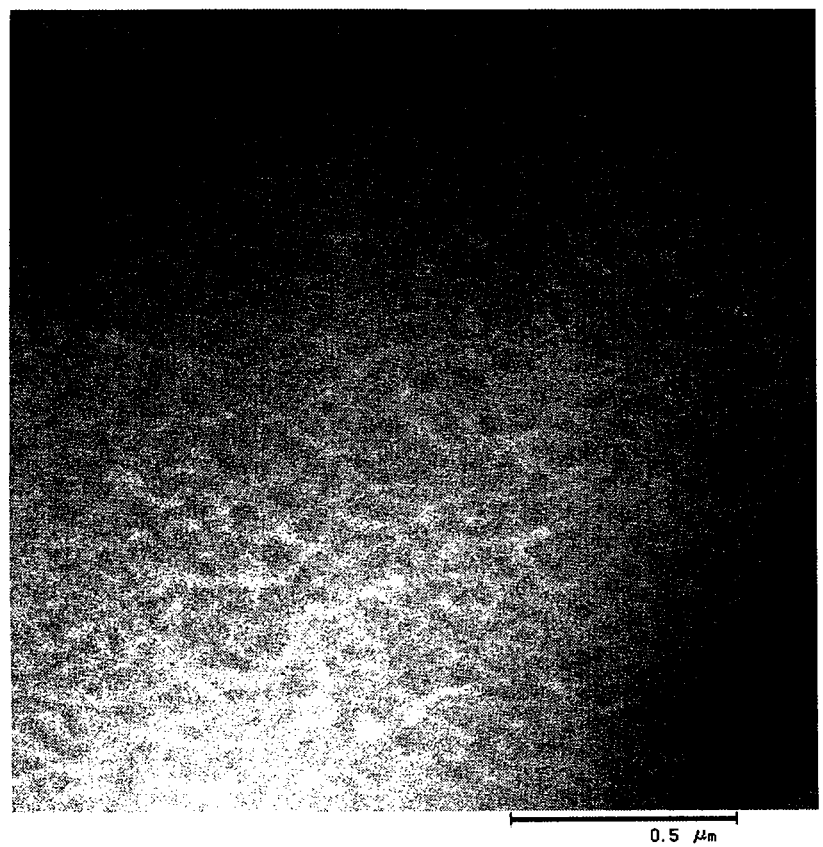
FIG. 1 is an electron micrograph of particle surface texture of a positive electrode active material of Example 1.

Hereinafter, the present invention will be described in detail with reference to embodiments thereof.

The positive electrode forming material according to an embodiment of the invention includes particles of a positive electrode active material and fine carbon fibers adhering to surfaces of particles of the positive electrode active material in a shape of a network. In particular, carbon nanofibers having an average fiber diameter of 1 to 100 nm and an aspect ratio of 5 or greater may adhere so as to form a mesh to a surface of the positive electrode active material particle having an average particle diameter of 0.03 to 40 μm. Although not particularly limited, the particle diameter of the positive electrode active material is preferably 0.05 to 10 μm, the fiber diameter of the carbon nanofiber is preferably 5 to 50 nm and the aspect ratio is preferably 10 or greater.

A generally used positive electrode active material of a lithium battery consists of cobalt acid lithium ($LiCoO_2$) particles having an average particle diameter of 3 to 40 μm. The positive electrode forming material according to an embodiment of the present invention may preferably include carbon nanofibers as the fine carbon fibers having an average fiber diameter of 1 to 100 nm and an aspect ratio of 5 or greater to provide a network conductive film on the particle surface of the positive electrode active material. For sufficient conductivity, the volume resistance value of consolidated fiber powder of the carbon nanofiber may preferably be 1.0 Ωcm or less and the lamination interval of (002) face of a graphite layer determined in X diffraction measurement may preferably be 0.35 nm or less.

The positive electrode active material particles are added to a dispersion of fine carbon fibers. The dispersed fine carbon fibers are made to adhere to the particle surface of the positive electrode active material with a binder so as to form a film of the fine carbon fibers in the shape of the network. A conductive network between particles is also provided. In order to have the fine carbon fibers well-dispersed in a solution without a dispersing agent, surfaces of the fine carbon fibers may preferably be hydrophilized by oxidization.

Since carbon materials are typically hydrophobic and thus are hard to disperse in a solution, a conductive carbon material is usually made to disperse in the solution with a dispersing agent. The dispersing agent, however, is inevitably taken into a structure of a positive electrode during fabrication of the positive electrode. The taken dispersing agent may decompose and generate gases. The fine carbon fibers with surfaces hydrophilized by oxidization may be kept in a desired dispersion state in the solution without the dispersing agent.

The fine carbon fibers may be oxidized in the following manner. First, sulfur-containing strong acid, such as sulfuric acid, is added to the fine carbon fibers. An oxidizer, such as nitric acid, is then added. The obtained slurry is agitated under heat and then filtered. The remaining acid is removed by washing. It is considered that the fine carbon fibers are hydrophilized by polar functional groups, such as a carbonyl group, a carboxyl group and a nitro group, formed in the course of oxidation.

The content of the fine carbon fibers is 0.5 to 15 parts by mass and preferably 1 to 10 parts by mass with respect to 100 parts by mass of the positive electrode active material. If the content of the fine carbon fibers is less than 0.5 parts by mass, conductivity may not be improved sufficiently. If the content of the fine carbon fibers is greater than 15 parts by mass, the relative content of the positive electrode active material becomes unsuitably small.

The fine carbon fibers dispersed in the solution is made to adhere to the particle surface of the positive electrode active material by the binder in the dispersed state thereof to form network coating of the fine carbon fibers. The binder may be polyvinylidene fluoride (PVdF) or carboxymethyl cellulose (CMC). The content of the binder is 0.5 to 10 parts by mass and is preferably 1 to 5 parts by mass with respect to 100 parts by mass of the positive electrode active material. If the content of the binder is less than 0.5 parts by mass, the fine carbon fibers are less likely to adhere to the particle surface. If the content of the binder is greater than 10 parts by mass, the relative content of the positive electrode active material or the fine carbon fibers become unsuitably small.

Carbon powder that is finer than the positive electrode active material may be used together with the fine carbon fibers. The carbon powder may be carbon black having an average primary particle diameter of 10 nm. The fine carbon powder enters the space between particles of the positive electrode active material to further increase conductivity. The carbon powder may be added before, simultaneously or after the addition of the fine carbon fibers.

The content of the carbon powder is 0.5 to 5 parts by mass and preferably 1 to 3 parts by mass with respect to 100 parts by mass of the positive electrode active material. If the content of the carbon powder is less than 0.5 parts by mass, the carbon powder becomes less effective. If the content of the carbon powder is greater than 5 parts by mass, the total content with the fine carbon fibers become large and thus the relative content of the positive electrode active material becomes unsuitably small. In order to enhance the advantageous effect of addition of the fine carbon fibers, the content of the carbon powder is preferably larger than the content of the fine carbon fibers.

Examples of the carbon powder may include powder consisting of carbon black, Ketchen black, acetylene black, coal, corks, polyacrylonitrile-based carbon fiber, pitch-based carbon fiber, carbonized organic material, natural graphite, artificial graphite, synthetic graphite, mesocarbon microbead, graphitized organic material and graphite fiber.

The positive electrode forming material according to an embodiment of the present invention may preferably be applied to a positive electrode of a lithium-ion battery which includes lithium-containing transition metal oxide particles as the positive electrode active material. In particular, the lithium-containing transition metal oxide may be a compound which includes one or both of at least one compound selected from a group consisting of $LiCoO_2$, $LiNiO_2$, $LiMn_2O_4$, $LiMnCoO_4$, $LiCoPO_4$, $LiMnCrO_4$, $LiNiVO_4$, $LiMn_{1.5}Ni_{0.5}O_4$, $LiMnCrO_4$, $LiCoVO_4$ and $LiFePO_4$ and at least one compound selected from nonstoichiometric compounds having the above composition that is partially substituted by one or more metallic elements selected from a group consisting of Mn, Mg, Ni, Co, Cu, Zn, and Ge. The positive electrode active material may be fabricated with carbon black, Ketchen black and acetylene black to improve conductivity.

In the present invention, the fine carbon fiber for the positive electrode forming material adhering to the particle surface of the positive electrode active material in the shape of the network may be carbon nanofiber having an average fiber diameter of 1 to 100 nm and an aspect ratio of 5 or greater. The surfaces of the carbon nanofiber are hydrophilized by oxidization, which facilitates dispersion in a solution without the dispersing agent.

The present invention includes a dispersion for the positive electrode forming material prepared by dispersing the fine carbon fibers with surfaces hydrophilized by oxidization in a solvent (i.e., a dispersion medium) for forming a network coating of the fine carbon fibers on a surface of the positive electrode active material. The solvent in which the fine carbon fibers are dispersed may preferably be a polar solvent, such as N-methyl pyrrolidone, dimethylacetamide, dimethylformamide or water.

The dispersion of the fine carbon fibers may be prepared by: adding an oxidizer to acid suspension including the fine carbon fibers to oxidize the same; hydrophilizing surfaces of the fine carbon fibers by oxidization; collecting the fine carbon fibers by filtering separation; and mixing the fine carbon fibers with one or more dispersion media selected from a group consisting of a solvent and water.

The present invention also includes a coating material as a component of the positive electrode forming material. The coating material is prepared by adding a binder to a dispersion in which the fine carbon fibers with surfaces hydrophilized by oxidization is dispersed in one or more dispersion media selected from a group consisting of a solvent and water.

The positive electrode forming material according to an embodiment of the present invention may be slurry or paste containing the fine carbon fibers dispersion, the binder and the positive electrode active material. The slurry or paste may be prepared by adding the binder and the positive electrode active material to the fine carbon fibers dispersion, or may be prepared by adding the positive electrode active material may to a coating material, which may be prepared by adding the binder to a dispersion of the fine carbon fibers.

Figure 6:
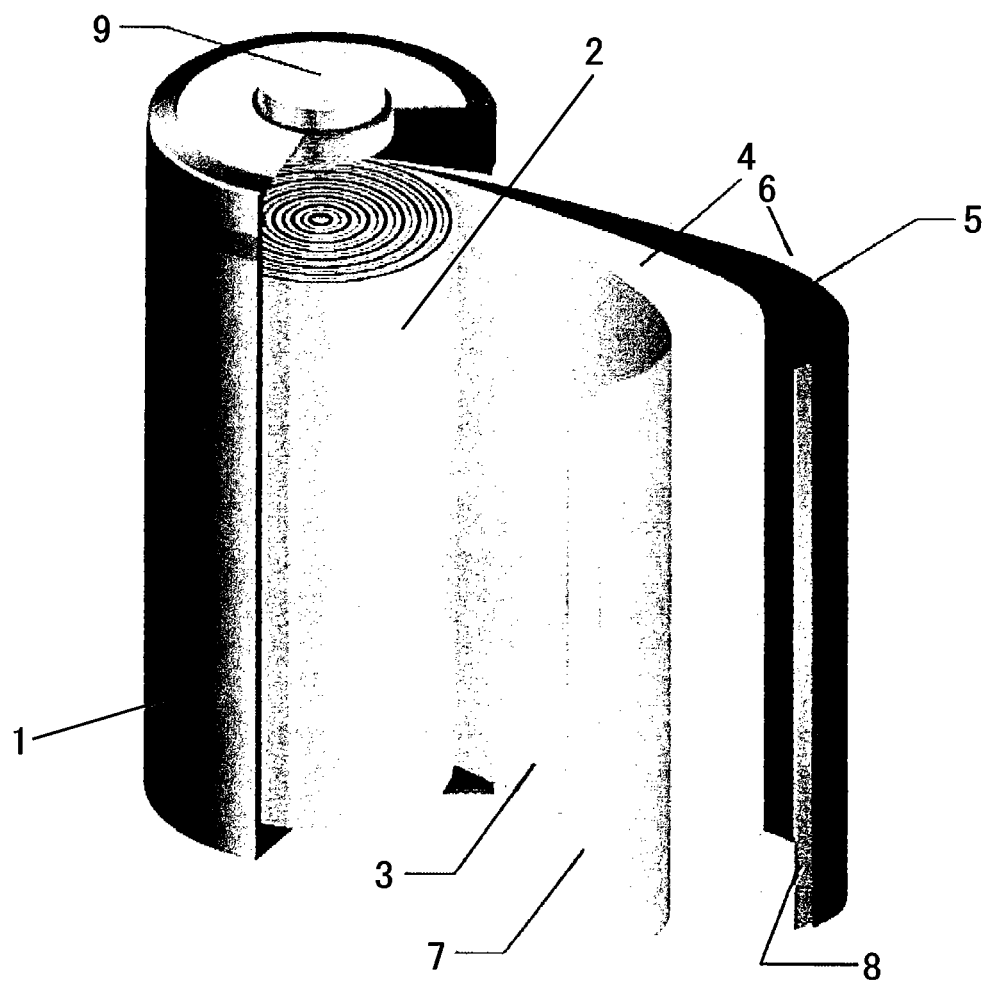
FIG. 6 is an exploded perspective view of a rechargeable lithium-ion battery according to an embodiment of the present invention.

FIG. 6 is a perspective view of a rechargeable lithium-ion battery according to an embodiment of the present invention. A closed-end cylindrical housing made from a Ni steel plate is shown in FIG. 6. A roll body 2 is sealed by the housing 1 together with a nonaqueous electrolyte. The roll body 2 includes a web-shaped positive electrode forming material 3, a separator 4, a negative electrode material 5 and a separator 6 laminated in this order and then rolled up together. The positive electrode forming material 3 is fabricated by uniformly applying, on both sides of the Al alloy foil 7, a positive electrode mixture (i.e., a positive electrode active material mixture) which includes a lithium transition metal multiple oxide as a positive electrode active material. The negative electrode material 5 is fabricated by uniformly applying a negative electrode mixture (i.e., a negative electrode active material mixture) containing amorphous carbon powder as a negative electrode active material on both sides of the Cu alloy foil 8. The amorphous carbon powder may absorb and emit the lithium ion. The nonaqueous electrolyte contained in the housing 1 with the roll body 2 may be prepared by dissolving lithium hexafluorophosphate ($LiPF_6$) as lithium salt in an organic solvent, such as ethylene carbonate (EC). The separators 4 and 6 may be porous polymers, such as polyolefin-based resin. A metallic, circular-shaped, conductive positive electrode 9 is provided in an extension of a winding center of the roll body 2. The positive electrode 9 is connected to the positive electrode forming material 3 with a lead, which is not described, for collecting potential from a positive electrode plate. The positive electrode 9 is welded to an upper lid of the housing 1. The other side of the positive electrode 9 is formed as a negative electrode for collecting electric charge from the negative electrode material 5. The negative electrode is connected to a negative electrode material 5 via a lead, which is not described. The battery shown in FIG. 6 is illustrative only and may be modified within a range of a basic configuration of a battery.

EXAMPLES

Hereinafter, Examples and Comparative Examples of the present invention will be described.

Example 1

(1) Preparation of CNF Dispersion

Tubular carbon nanofiber (CNF) having an average fiber diameter of 20 nm was added to a mixed liquid of nitric acid (concentration: 60%) and sulfuric acid (concentration: 95% or greater) such that the proportion of the CNF, the nitric acid and the sulfuric acid was 1:5:15 (parts by weight). The mixture was then heated and surface-oxidized. The obtained solution was filtered and remaining acid was removed after washing several times. The filtered solution was then dried and powderized. The obtained powder was dissolved in N-methyl pyrrolidone (NMP) to provide a CNF dispersion.

(2) Preparation of Positive Electrode Forming Material and Fabrication of Positive Electrode $LiCoO_2$ having an average particle diameter of 15 μm (capacity: 140 mAh/g) was prepared as a lithium-containing transition metal oxide and polyvinylidene fluoride (PVdF)

was prepared as a binder. First, a NMP dispersion of PVdF and CNF was mixed at a solid content weight ratio of 1:1 to prepare a coating material. Subsequently, $LiCoO_2$, PVdF and CNF were mixed in proportion of 100:5:5 (parts by weight) and agitated to prepare positive electrode slurry. The positive electrode slurry was applied, dried and then extended on a positive electrode current collector to fabricate a 0.09-cm-thick positive electrode film. The positive electrode current collector was aluminum foil. The positive electrode film was cut into a centimeter square to fabricate a positive electrode (i.e., a working electrode).

Example 2

A positive electrode was fabricated as in Example 1 except that the proportion of $LiCoO_2$, PVdF and CNF was 100:5:4 (parts by weight).

Example 3

A positive electrode was fabricated as in Example 1 except that the proportion of $LiCoO_2$, PVdF and CNF was 100:5:3 (parts by weight).

Example 4

A positive electrode was fabricated as in Example 1 except that the proportion of $LiCoO_2$, PVdF and CNF was 100:5:1 (parts by weight).

Example 5

A positive electrode was fabricated as in Example 1 except that the proportion of $LiCoO_2$, PVdF and CNF was 100:5:8 (parts by weight).

Example 6

A positive electrode was fabricated as in Example 1 except that carbon powder (average primary particle diameter: 30 nm or less, DENKA BLACK produced by Denki Kagaku Kogyo Kabushiki Kaisha) was added as a conductive additive. The proportion of the $LiCoO_2$, PVdF, CNF and the carbon-based material was 100:5:4:3 (parts by weight).

Example 7

A positive electrode was fabricated as in Example 6 except that the proportion of $LiCoO_2$, PVdF, CNF and the carbon-based material was 100:5:5:3 (parts by weight).

Comparative Example 1

A positive electrode was fabricated as in Example 6 except that no carbon nanofiber was added but the carbon powder was used. The proportion of $LiCoO_2$, PVdF and the carbon powder was 100:5:1 (parts by weight).

Comparative Example 2

A positive electrode was fabricated as in Comparative Example 1 except that the proportion of $LiCoO_2$, PVdF and the carbon-based material was 100:5:5 (parts by weight).

Comparative Example 3

A positive electrode was fabricated as in Comparative Example 1 except that the proportion of $LiCoO_2$, PVdF and the carbon-based material was 100:5:1 (parts by weight).

Comparative Test

Figure 5:
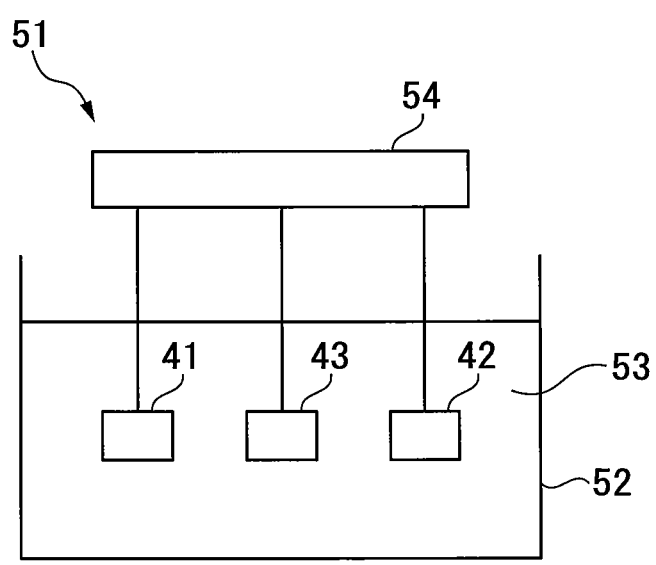
FIG. 5 is a schematic diagram of a device for a charging and discharging cycle test.

As shown in FIG. 5, each of the positive electrodes 41 fabricated in Examples 1 to 7 and Comparative Examples 1 to 3 was mounted on a test device 51 for a charging and discharging cycle test. The test device 51 had a container 52 which held an electrolyte solution 53 (i.e., an organic solvent with lithium salt dissolved therein). The positive electrode 41 (i.e., a working electrode), the negative electrode 42 (i.e., a counter electrode) and the reference electrode 43 were placed in the electrolyte solution 53 and were also electrically connected to a potentiostat 54 (i.e., a potentiometer). 1M $LiPF_6$ was used as the lithium salt. The organic solvent was a solution containing ethylene carbonate or a solution containing diethyl carbonate. A charging and discharging cycle test was conducted on the test device 51 to measure low-rate discharge capacity and high-rate discharge capacity of each of the positive electrodes. The low-rate discharge capacity was measured at 25 mA/g and the high-rate discharge capacity was measured at 150 mA/g. The measurement voltage range was set to 4.3V to 3V. The measurement results for the positive electrodes of Examples 1 to 7 and Comparative Examples 1 to 3 were shown in Table 1.

As clearly shown in Table 1, in the positive electrode active materials of Comparative Examples 1 to 3 which contained no carbon nanofiber, the high-rate discharge capacity dropped considerably and the capacity of the electrode was significantly decreased with respect to the electrode weight. The positive electrode active materials in Examples 1 to 7, however, had no significant difference between the low-rate discharge capacity and the high-rate discharge capacity. Electrodes fabricated by using the positive electrode active materials in Examples 1 to 7 may have enhanced high-rate discharging performance. It was also confirmed that the capacity with respect to the electrode weight improved significantly.

TABLE 1

|  | positive electrode active material ($LiCoO_2$) (parts by mass) | Binder (PVdF) (parts by mass) | Carbon nanofiber (CNF) (parts by mass) | Carbon powder (parts by mass) | Low-rate discharging performance (mAh/g) | High-rate discharging performance (mAh/g) | Retention rate at high-rate discharging (mAh/g) |
|---|---|---|---|---|---|---|---|
| Example 1 | 100 | 5 | 5 | 0 | 120 | 114 | 95 |
| Example 2 | 100 | 5 | 4 | 0 | 120 | 116 | 93 |
| Example 3 | 100 | 5 | 3 | 0 | 119 | 105 | 88 |
| Example 4 | 100 | 5 | 1 | 0 | 122 | 105 | 83 |
| Example 5 | 100 | 5 | 8 | 0 | 115 | 110 | 96 |
| Example 6 | 100 | 5 | 4 | 3 | 115 | 107 | 93 |
| Example 7 | 100 | 5 | 5 | 3 | 115 | 107 | 93 |
| Comparative Example 1 | 100 | 5 | 0 | 1 | 105 | 78 | 74 |

TABLE 1-continued

| | positive electrode active material (LiCoO$_2$) (parts by mass) | Binder (PVdF) (parts by mass) | Carbon nanofiber (CNF) (parts by mass) | Carbon powder (parts by mass) | Low-rate discharging performance (mAh/g) | High-rate discharging performance (mAh/g) | Retention rate at high-rate discharging (mAh/g) |
|---|---|---|---|---|---|---|---|
| Comparative Example 2 | 100 | 5 | 0 | 5 | 107 | 94 | 88 |
| Comparative Example 3 | 100 | 5 | 0 | 10 | 103 | 92 | 89 |

Figure 2:
FIG. 2 is an electron micrograph of particle surface texture of the positive electrode active material of Example 1.
Figure 3:
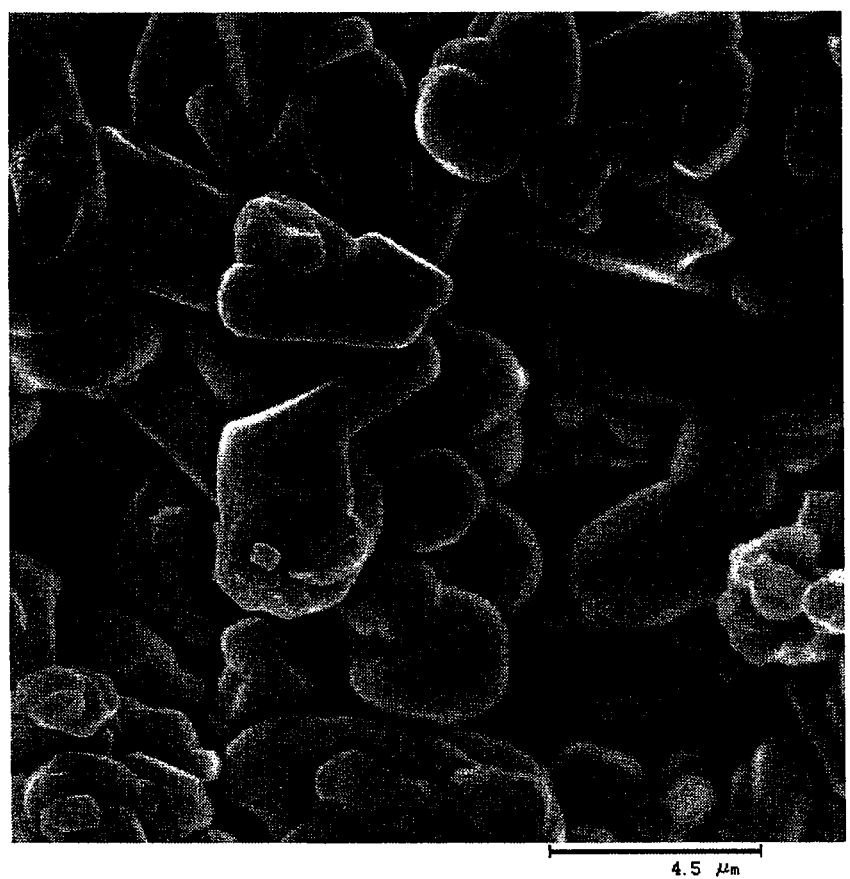
FIG. 3 is an electron micrograph of particle surface texture of a positive electrode active material of Comparative Example.
Figure 4:
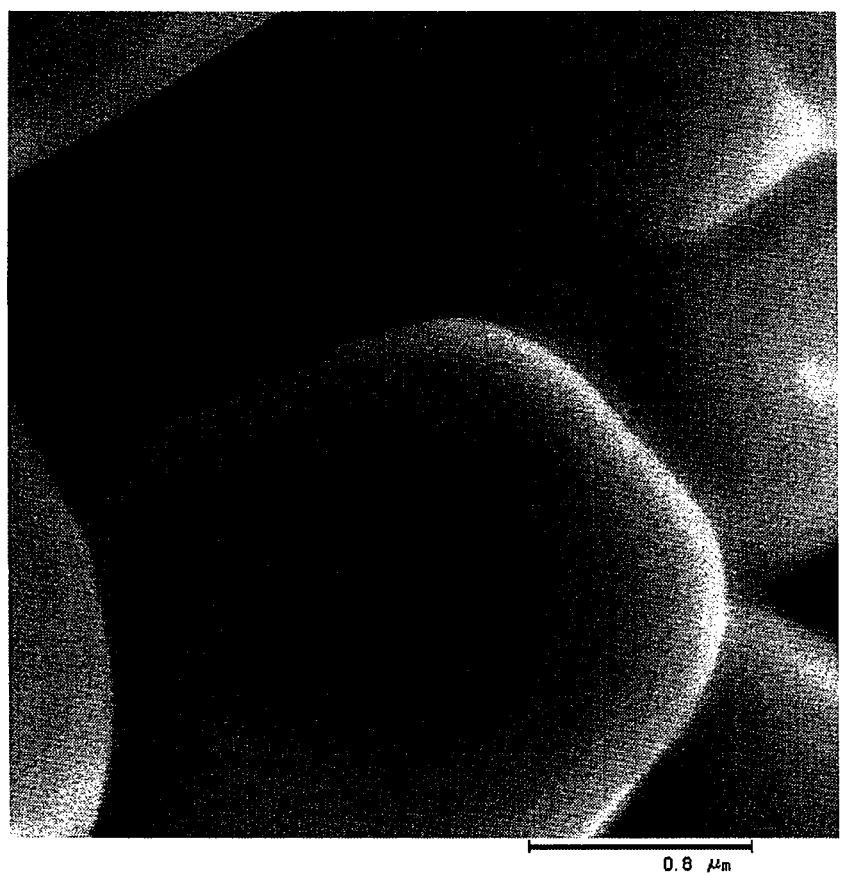
FIG. 4 is an electron micrograph of particle surface texture of the positive electrode active material of Comparative Example.

FIG. 1 is an electron micrograph of 50000-fold magnification and FIG. 2 is an electron micrograph of 30000-fold magnification of the particle surface of the positive electrode active material included in the positive electrode slurry prepared in Example 1. As shown in these drawings, a network coating is formed on the particle surface. In comparison with comparative particles shown in an electron micrograph of 5000-fold magnification of FIG. 3 and an electron micrograph of 30000-fold magnification of FIG. 4, the coating is recognized as a network coating of carbon nanofiber (CNF). The particle surface is exposed through gaps of the network. The comparative particles shown in FIG. 3 and FIG. 4 were positive electrode active materials for the positive electrode slurry including no carbon nanofiber, carbon powder or binder. No network coating is formed on the particle surfaces.

According to the positive electrode forming material of an embodiment of the present invention with fine carbon fibers coating made to disperse in a solution and adhere to the particle surface of the positive electrode active material in a shape of a network, the positive electrode may acquire greater conductivity with a relatively small content of carbon fiber, and may exhibit enhanced battery output performance.

The invention claimed is:

1. A positive electrode forming material for a positive electrode of a battery, the material comprising:
    particles of a positive electrode active material; and
    fine carbon fibers adhering to surfaces of the particles of the positive electrode active material in a shape of a network, wherein
    the positive electrode active material consists of fine particles having an average particle diameter of 0.03 to 40 μm,
    each of the fine carbon fibers is a carbon nanofiber having an average fiber diameter of 1 to 100 nm and an aspect ratio of 5 or greater,
    a lamination interval of (002) face of graphite layers of the carbon nanofiber is 0.35 nm or less, and
    a surface of the carbon nanofiber is oxidized.

2. The positive electrode forming material according to claim 1, further comprising a binder, wherein the content of the fine carbon fibers is 0.5 to 15 parts by mass and the content of the binder is 0.5 to 10 parts by mass with respect to 100 parts by mass of the positive electrode active material.

3. The positive electrode forming material according to claim 1, further comprising carbon powder that is finer than the positive electrode active material.

4. The positive electrode forming material according to claim 3, wherein the content of the carbon powder is 0.5 to 5 parts by mass with respect to 100 parts by mass of the positive electrode active material.

5. The positive electrode forming material according to claim 1 for forming a positive electrode of a lithium battery, wherein the positive electrode active material is a lithium-containing transition metal oxide.

6. The positive electrode forming material according to claim 5, wherein the lithium-containing transition metal oxide of the positive electrode active material is at least one compound selected from a group consisting of LiCoO$_2$, LiNiO$_2$, LiMn$_2$O$_4$, LiMnCoO$_4$, LiCoPO$_4$, LiMnCrO$_4$, LiNiVO$_4$, LiMn$_{1.5}$Ni$_{0.5}$O$_4$, LiMnCrO$_4$, LiCoVO$_4$, LiFePO$_4$ and nonstoichiometric compounds having the above composition that is partially substituted by one or more metallic elements selected from a group consisting of Mn, Mg, Ni, Co, Cu, Zn, and Ge.

7. A positive electrode forming material according to claim 1, wherein each of the particles of the positive electrode active material has a diameter of 0.05 to 10 μm, and
    the carbon nanofiber has a diameter of 5 to 50 nm and an aspect ratio of 10 or greater.

8. A slurry or a paste for a positive electrode forming material used in forming a network coating on a particle surface of a positive electrode active material, said slurry or paste comprising:
    a dispersion;
    a binder; and
    the positive electrode active material, wherein
    the dispersion is prepared by dispersing fine carbon fibers with surfaces hydrophilized by oxidization in one or more dispersing solvents selected from a group consisting of a solvent and water,
    the positive electrode active material consists of fine particles having an average particle diameter of 0.03 to 40 μm,
    the dispersion includes the fine carbon fibers and the dispersive agent, where each of the fine carbon fibers is a carbon nanofiber having an average fiber diameter of 1 to 100 nm and an aspect ratio of 5 or greater, and
    a lamination interval of (002) face of graphite layers of the carbon nanofiber is 0.35 nm or less.

9. A method for preparing a dispersion for a positive electrode forming material, the method comprising the steps of:
    adding sulfur-containing strong acid to fine carbon fibers to form an acid suspension;
    adding nitric acid to the acid suspension of fine carbon fibers to form a slurry;
    agitating the slurry under heat and thereby hydrophilizing a surface of the fine carbon fibers by oxidization;
    collecting the fine carbon fibers by filtering separation; and
    mixing the fine carbon fibers with a dispersion medium, wherein
    each of the fine carbon fibers is a carbon nanofiber having an average fiber diameter of 1 to 100 nm and an aspect ratio of 5 or greate, and
    a lamination interval of (002) face of graphite layers of the carbon nanofiber is 0.35 nm or less.

10. A method for preparing a coating material for a positive electrode forming material, the method comprising the steps of adding a binder to a dispersion, the dispersion being prepared by the method according to claim 9.

11. A method for preparing slurry or paste for a positive electrode forming material, the method comprising the steps of adding a binder and a positive electrode active material to a dispersion, the dispersion being prepared by the method according to claim 9, wherein the positive electrode active material consists of fine particles having an average particle diameter of 0.03 to 40 µm.

12. The method according to claim 9,
wherein carbon powder that is finer than the positive electrode active material is added before, simultaneously or after the addition of the fine carbon fibers.

13. A positive electrode of a rechargeable lithium-ion battery, the positive electrode being fabricated by coating the slurry or paste of the positive electrode forming material according to claim 8 onto an aluminum current collector and then drying, wherein
wherein the positive electrode includes the positive electrode active material with particle surfaces coated with the network of the fine carbon fibers.

14. A rechargeable lithium-ion battery comprising:
a positive electrode according to claim 13;
a negative electrode;
a separator for separating the positive electrode from the negative electrode; and
an electrolyte solution made in contact with the positive electrode and the negative electrode.

* * * * *